(12) United States Patent
Leca

(10) Patent No.: US 10,563,989 B2
(45) Date of Patent: Feb. 18, 2020

(54) VISUAL AND LATERALIZED NAVIGATION ASSISTANCE SYSTEM

(71) Applicant: ONTRACKS, Marseilles (FR)

(72) Inventor: Philippe Leca, Marseilles (FR)

(73) Assignee: ONTRACKS, Marseilles (FR)

( * ) Notice: Subject to any disclaimer, the term of this patent is extended or adjusted under 35 U.S.C. 154(b) by 0 days.

(21) Appl. No.: 16/278,847

(22) Filed: Feb. 19, 2019

(65) Prior Publication Data

US 2019/0178652 A1   Jun. 13, 2019

Related U.S. Application Data

(63) Continuation of application No. PCT/FR2017/052242, filed on Aug. 18, 2017.

(30) Foreign Application Priority Data

Aug. 19, 2016   (FR) ...................... 16 57832

(51) Int. Cl.
  *G01C 21/00*   (2006.01)
  *G01C 21/28*   (2006.01)
  (Continued)

(52) U.S. Cl.
  CPC ............. *G01C 21/28* (2013.01); *G01C 21/20* (2013.01); *G01C 21/265* (2013.01); *G01C 21/367* (2013.01); *G01C 21/3632* (2013.01); *G01C 21/3688* (2013.01); *G06F 3/1423* (2013.01); *G09G 2340/14* (2013.01)

(58) Field of Classification Search
  CPC combination set(s) only.
  See application file for complete search history.

(56) References Cited

U.S. PATENT DOCUMENTS 2,952,119 A * 9/1960 Kunzmann .............. A44C 5/08
   59/79.3
4,055,057 A * 10/1977 Kolman ............... A44C 5/2014
   63/7

(Continued)

FOREIGN PATENT DOCUMENTS

EP   2690406 A1   1/2014
WO  0018612 A1   4/2000

(Continued)

*Primary Examiner* — Khoi H Tran
*Assistant Examiner* — Jorge O Peche
(74) *Attorney, Agent, or Firm* — Buchanan Ingersoll & Rooney PC

(57) ABSTRACT

The invention relates to a navigation assistance system comprising an electronic device and first and second human-machine interfaces that cooperate with the electronic device. The latter produces an orientation instruction, in the form of a message transmitted to one of said first and second human-machine interfaces depending on the orientation of a change of direction. Each human-machine interface advantageously comprises a display for outputting a light indication in response to the reception of the message. Advantageously positioned to the left and right, respectively, within the field of vision of a user of the system, the displays of the first and second human-machine interfaces output to the user a visual and lateralized navigational aid that is particularly intuitive and non-invasive.

16 Claims, 3 Drawing Sheets

(51) Int. Cl.
*G01C 21/20* (2006.01)
*G01C 21/36* (2006.01)
*G01C 21/26* (2006.01)
*G06F 3/14* (2006.01)

(56) References Cited

U.S. PATENT DOCUMENTS

| | | | | |
|---|---|---|---|---|
| 5,247,814 A * | 9/1993 | McDonald | | A44C 5/22 |
| | | | | 351/157 |
| 6,545,598 B1 | 4/2003 | de Villeroche | | |
| 9,288,836 B1 * | 3/2016 | Clement | | H04W 84/18 |
| 9,772,190 B2 * | 9/2017 | Erkkila | | A63B 24/0021 |
| 9,898,039 B2 * | 2/2018 | Moore | | A61B 5/02438 |
| 10,012,505 B2 * | 7/2018 | Dayal | | G01C 21/00 |
| 10,024,680 B2 * | 7/2018 | Lee | | G01C 21/206 |
| 2003/0030595 A1 * | 2/2003 | Radley-Smith | | A44C 5/0007 |
| | | | | 345/1.3 |
| 2006/0242599 A1 * | 10/2006 | Choo | | G06F 16/957 |
| | | | | 715/821 |
| 2008/0236195 A1 * | 10/2008 | Woebke | | A44C 5/003 |
| | | | | 63/1.14 |
| 2009/0122457 A1 * | 5/2009 | Hee | | A61N 1/14 |
| | | | | 361/220 |
| 2010/0085279 A1 * | 4/2010 | Repko | | A44C 5/0015 |
| | | | | 345/76 |
| 2013/0086502 A1 * | 4/2013 | Rysa | | G06F 3/0482 |
| | | | | 715/773 |
| 2013/0212535 A1 * | 8/2013 | Kim | | G06F 3/0482 |
| | | | | 715/841 |
| 2014/0032112 A1 * | 1/2014 | Hansen | | G01C 21/00 |
| | | | | 701/533 |
| 2014/0150223 A1 * | 6/2014 | Kaltenrieder | | A44C 5/246 |
| | | | | 24/71 J |
| 2014/0368424 A1 * | 12/2014 | Choi | | G06F 3/015 |
| | | | | 345/156 |
| 2015/0135108 A1 * | 5/2015 | Pope | | G06K 9/00006 |
| | | | | 715/767 |
| 2015/0331081 A1 | 11/2015 | Wharton et al. | | |
| 2016/0216130 A1 * | 7/2016 | Abramson | | G01C 21/3626 |
| 2016/0259905 A1 * | 9/2016 | Park | | G16H 20/40 |
| 2016/0260418 A1 * | 9/2016 | Zhang | | G06F 3/0488 |
| 2017/0251268 A1 * | 8/2017 | Zhao | | H04N 21/4126 |
| 2017/0303646 A1 * | 10/2017 | Bricken | | G06F 1/1652 |
| 2017/0319940 A1 * | 11/2017 | Beneyto-Ferre | | A63B 69/0028 |
| 2018/0018080 A1 * | 1/2018 | Chudzinski | | G06F 3/0485 |
| 2018/0074653 A1 * | 3/2018 | Pommier | | G06F 3/0488 |
| 2018/0364648 A1 * | 12/2018 | Chi | | G04G 9/007 |
| 2019/0146219 A1 * | 5/2019 | Rodriguez, II | | G02B 27/017 |
| | | | | 345/633 |

FOREIGN PATENT DOCUMENTS

| | | |
|---|---|---|
| WO | 2006088424 A1 | 8/2006 |
| WO | 2007105937 A1 | 9/2007 |
| WO | 2016074689 A1 | 5/2016 |

* cited by examiner

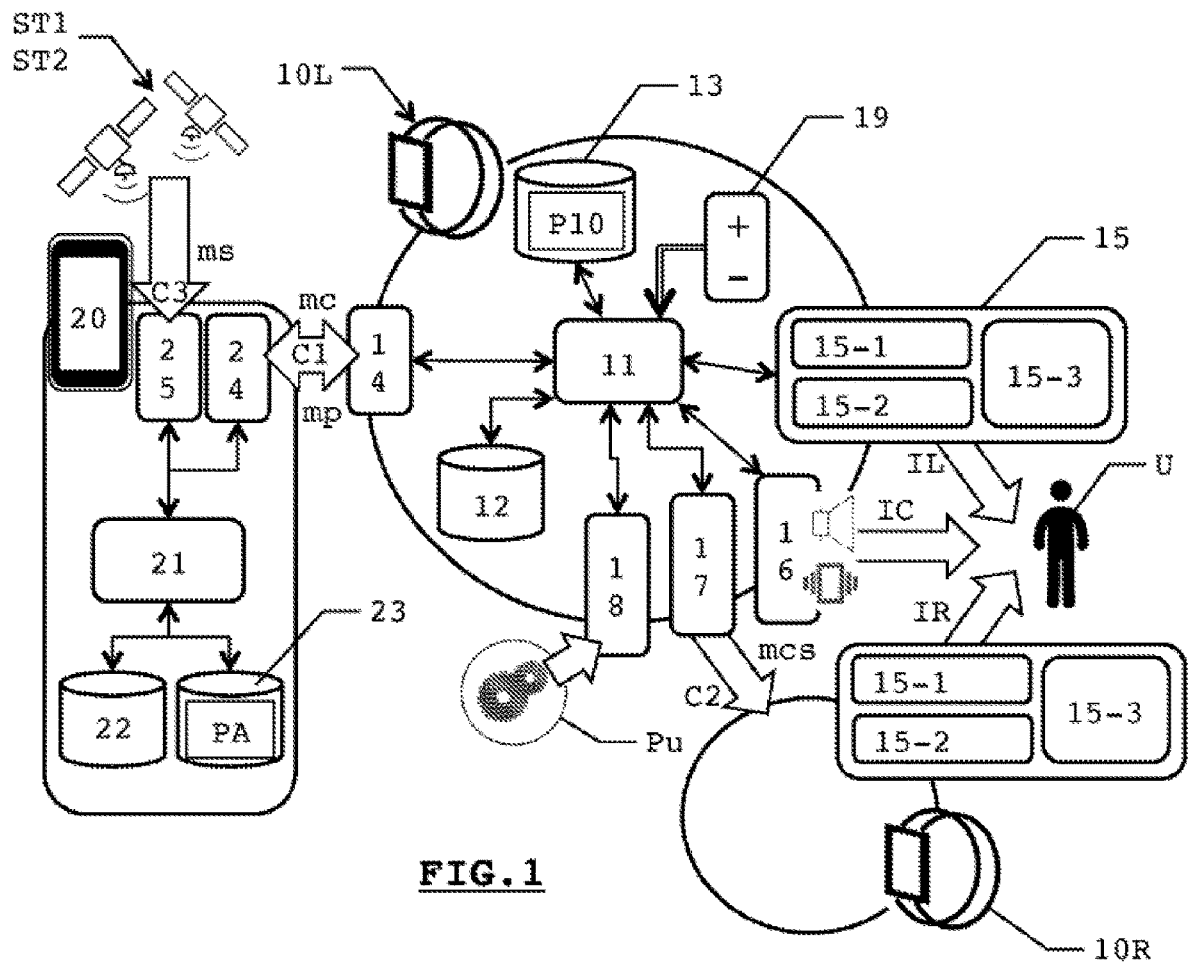
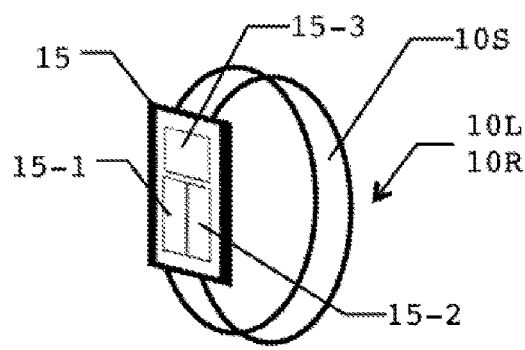
FIG.1
FIG.5

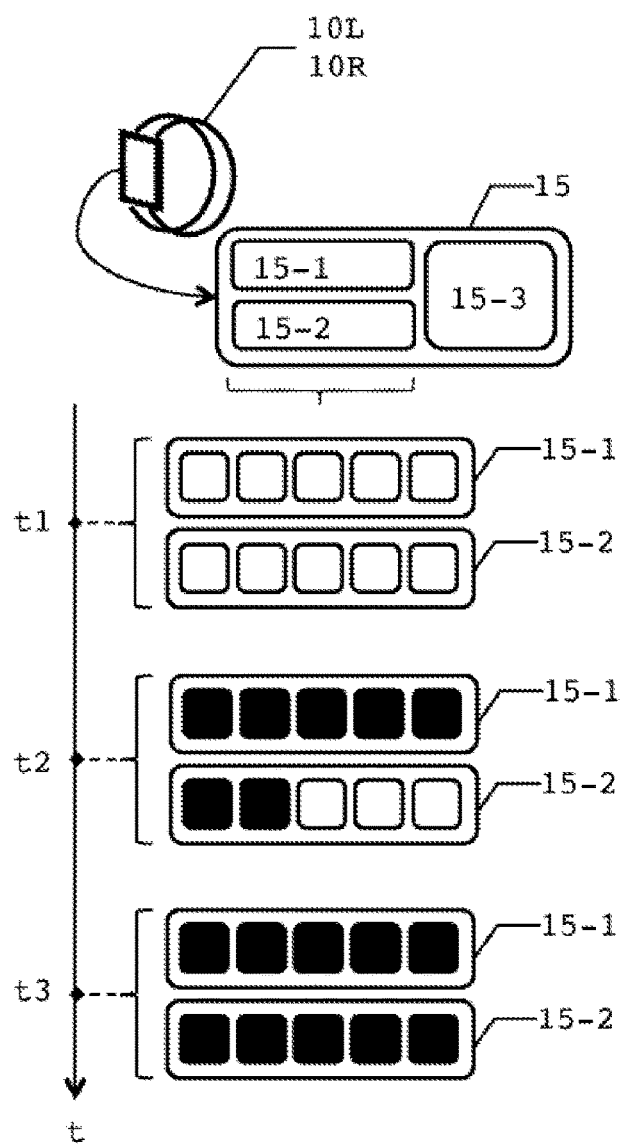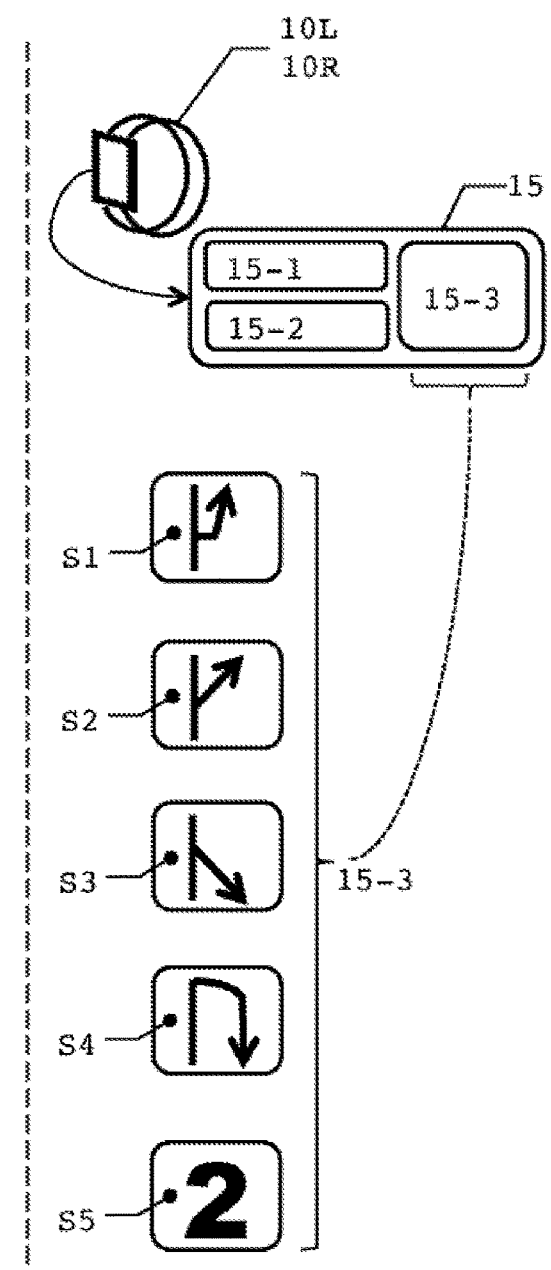
FIG.4A
FIG.4B

VISUAL AND LATERALIZED NAVIGATION ASSISTANCE SYSTEM

FIELD OF THE INVENTION

The invention relates to a visual and lateralized navigation assistance system that can be used by the majority of us, whatever the mode of travel and space to be traversed. More particularly, and without constituting a limitation, the invention thus offers valuable help while hiking, biking, or skiing. The invention also remains relevant in terms of providing a navigational aid during a journey on or in a motor vehicle. Although it is particularly suited to land travel, the invention can also be exploited during journeys undertaken on the surface of the water or in the air.

BACKGROUND OF THE INVENTION

To move as freely as possible in space is a constant concern for mankind. However, freedom of movement does not rule out relinquishing some for the sake of comfort in the search for performance or even a kind of serenity and safety during a trip in order to avoid any risk of distraction while mountain hiking, for example, or any disappointment from not having been able to reach a remarkable viewpoint for lack of knowledge of a route or site. Many solutions, from the most basic to the most sophisticated, have been developed in order to achieve this goal, with varying degrees of success.

To begin with, route marking solutions exist for the city or the mountains. Directional signs are physically put in place at regular intervals in order to provide a guide or a visual aid on a trip or route. In the mountains, markers are affixed to the ground, to rocks, and/or to trees in order to indicate a recommended hiking or cycling route. This type of solution requires a relatively static and sustainable definition of the routes. Indeed, such markers and/or signs require human intervention in order to implement any change in route. What is more, a hiker may only become aware of an erroneous orientation at a very late stage, at the risk of finding himself in an unfortunate position or exhausted by the necessity of making an unplanned detour.

Primarily in the context of a road or motorway, many drivers of vehicles use a complementary solution that is much more sophisticated than markers or signage on the ground. For instance, an operator of a motorized land vehicle such as an automobile or a transporter for people or goods may, while traveling, consult a screen that is positioned within the passenger compartment of the vehicle that displays a travel chart in real time in the form of a dynamic roadmap and provides orientation guidance in the form of text, a mixture of graphics and text, and sound over the course of a route. For this purpose, a vehicle is equipped with an electronic navigational aid near the dashboard that may or may not have a touch screen and has a sufficient display size that is generally of the order of ten to twenty centimeters diagonally, so that the driver can follow and consult the roadmap visually and comfortably as it updates in real time, admittedly by diverting some of his attention away from driving. Such equipment also includes a computer and satellite communication means for spatially localizing the vehicle. Before departing, the driver can obtain information about a desired place of destination and, according to configuration parameters stored in the memory of the equipment, and reflecting certain preferences of the driver, such as the recommendation of the shortest route in terms of distance or time, the most economical route in terms fuel efficiency, toll charges, etc., the calculator of the equipment determines a relevant route and then provides routing information using graphics and sounds along the route. Some solutions, such as those described in documents EP 2690406 A1 and WO 00/18612, for example, make it possible to repeat or shift all or part of certain graphical orientation information, which is generally provided by a console or a central screen within a driver's compartment, to side display devices, at least to which the driver of an appropriately equipped land vehicle naturally directs his eyes during maneuvers, such as rearview mirrors. Such solutions are reserved for the automobile and translate into rearview mirrors that are costly and dedicated to a given vehicle. More minimalist versions exist in the form of portable equipment that is dedicated to navigation, or as software applications that are intended to adapt a smart mobile phone that is hosting such an application. Such mobile equipment that has been adapted in this way offers a similar solution in terms of functionality while providing mobility, enabling the user to not return his navigation assistance equipment residing permanently within a given vehicle. Such mobile devices are generally used along with appropriate support means that ensure that they are positioned and maintained close to the driver's field of vision. For instance, supports provide releasable attachment to an air vent of a dashboard, to a side window, or to a windshield of the vehicle by means of a suction cup. However, such solutions are expensive and require sophisticated and fragile equipment. In addition, manufacturers or publishers of such solutions are constantly seeking to improve the performance, graphical rendering, and the wealth of information provided—so much so that the user must sometimes make an intellectual effort in order to mentally extract the minority of information that is relevant and necessary for orientation among a multitude of secondary information, which is likely in some cases to divert his attention away from his primary mission of driving a vehicle.

Although some manufacturers of vehicles having onboard navigation assistance equipment attempt to position, physically or virtually, the screen providing such information such that it generally reproduces this information in a driver's nominal field of vision when the driver is watching the road, the visual information remains concentrated in one and the same small and limited area of the visual field. Moreover, and in practice, a driver is usually and regularly forced to move out of his natural position for viewing the road in order to direct his eyes toward the screen of the navigational aid and consult the information provided, at the risk of not anticipating an obstacle or losing control of the vehicle and causing an accident.

Other means of transport or modes of travel do not allow for the use of such navigation assistance devices. This is the case, for example, with walking, riding a bicycle, or, more generally, riding a two-wheeler, whether motorized or not. Some operators have proposed positioning a mobile device like those mentioned above on the frame, the handlebars, or the stem of a bicycle. For this purpose, suitable supports have been developed to hold a mobile phone on a bicycle, for example, or even a dedicated mobile device of reduced size compared to what is found in automobiles. However, this type of electronic equipment is not intended to be resistant to bad weather and falls. It can also be easily stolen by a malicious third party. A hiker usually prefers to store his valuable equipment in a waterproof pocket and consult it during breaks over the course of his journey, at the risk of inadvertently deviating from the selected route. Other equipment that is waterproof and more robust than a smart mobile phone has been proposed. They comprise a screen that is capable of displaying figurative symbols such as arrows, for example. With a diameter or radius of a few centimeters, the dimensions of the screen are modest so as not to pose a hindrance to the user. Alternatively, some equipment is similar to a compass that can be positioned in the center of the handlebars. A moving luminous point on the periphery of a circular dial indicates a relative direction. Other "compasses," such as those described in WO 2006/088424 A1, for example, make it possible to navigate a route marked only by the presence of certain land- and seamarks. Such a solution can be used in marine navigation, for example. However, such a visual display remains centralized and is ultimately low in terms of precision and semantics.

When such equipment is used by a pedestrian, he has no alternative but to hold it by hand, on one of his arms, on his belt, or on a garment.

Be that as it may, it remains the responsibility of the hiker or cyclist to consult, wisely and at the appropriate time, his navigational aids to read the orientation information. Between two readings, the hiker might deviate from the route. In order for a hiker to not put himself in danger, it is strongly recommended that such equipment be consulted only during a stop or break. This is because the hiker is not able to read and translate the information provided by the equipment such that it is instantaneously intelligible, so he may fall due to a lack of concentration if he consults his equipment while in motion. In order to prevent the user from forgetting to consult the equipment, or even to prevent progress from being slowed by excessively frequent consultations, some equipment round out the visual information with sound messages. In order not to pose a nuisance for the entourage, such a complementary solution requires the use of headphones or a headset. Wearing this type of accessory may be uncomfortable for hiking or competing, and listening to messages may be considered invasive to a walker who is seeking tranquility and silence or to an athlete who is trying to concentrate. Some have tried to design clothes, such as a jacket, such that they include means capable of providing orientation guidance using lights. This is the case of the solution described in WO 2016/074689 A1, for example. Such a solution has the dual benefit of freeing the user to carry a compass and providing lateralized information that can be intuitively and easily assimilated by the human. Within the garment, a central electronic device comprising two light-emitting diodes controls the illumination of the first or second diode according to the geographical positioning provided by a satellite tracking system operated by a mobile phone that is in communication with the central electronic device and introduced into a pocket of the garment that is provided for this purpose. By means of optical fibers, the light signal of each diode can be routed to the distal portions of the sleeves of the jacket. Such a solution is restrictive, however, because it is reserved to and integrated into the garment that is worn. If the user has to remove the garment or, conversely, to cover it with a second, impermeable garment or with a warmer one, depending on weather conditions, the light indications can no longer be utilized by the user. Furthermore, the light signal provided by such a garment is succinct to a fault, since it consists only of two light sources reduced to their simplest expression.

Far from the context of leisure or competition, another area of research involves providing assistance to visually impaired people to improve their mobility. To complement, or even supplant, the use of a rod to avoid hitting an obstacle, document WO 2007/105937 discloses an electronic belt comprising a plurality of vibrating means distributed around the wearer's abdominal belt. The different vibrating means are controlled by a computer in response to indications or commands emanating from a navigation assistance device that cooperates with the computer. By means of a vibratory language, the wearer of the belt can interpret orientation instructions transmitted by this or that vibrating means. However, such a solution is cumbersome and does not lend itself very well to use by a sighted hiker, because it requires some learning to be able to interpret precise and complex indications. In addition, a hiker on a mountain bike may not perceive the vibrations drowned in the jolts caused by rough terrain.

A hiker therefore has no other choice at present than to resort to navigation assistance equipment that is poorly adapted to his leisure activity, requiring him to consult a screen reproducing generally graphical indications outside of his natural field of vision, at the risk of going astray and unnecessarily increasing the length of a route due to an inappropriate frequency of consultation, or even falling or being injured due to a loss of concentration related to reading and/or interpreting an unintuitive instruction while underway.

In summary, no technical and realistic solution exists at present that offers equipment that is suited particularly to outdoor recreation, distilling orientation guidance for the hiker that is non-invasive and particularly intuitive to good effect and at appropriate times, all with great precision for a limited budget, making mass deployment conceivable.

BRIEF SUMMARY OF THE INVENTION

The invention achieves this object by providing a visual and lateralized navigation assistance system that resolves the drawbacks of known solutions. New prospects for hiking are thus within the reach of all, whatever the mode of travel.

In the remainder of the document, the term "lateralized" refers to any signal or information that can be perceived and/or positioned on or near an edge or side of the field of vision of a user of a system according to the invention. Thus, such a system provides a visual aid that can be described as "lateralized" because the visual indications are delivered laterally to the user, that is, preferably and advantageously on the left and/or on the right side of the field of vision, depending on the content of an orientation instruction. The information is thus delivered to good effect in order to be instinctively perceived and interpreted by the user so that the user will instinctively change their path without a loss of concentration. A "non-lateralized" aid may consist of a visual indication that is or is not centralized, distributed within the field of vision, or outside thereof, thus forcing a loss of visual tracking of the current path, which requires an interpretation on the user's part that is not instinctive and therefore indirect. By way of example, a representation of an indication in the form of a menu or in a literal or figurative form located in the center of the field of vision or on one of the sides thereof in a manner that is undifferentiated regardless of the nature of the indication will not be considered to be a "lateralized" indication or aid.

Likewise, the term "direction" will be used in the present document to describe a current path being taken by a user of a system according to the invention. A "direction" thus encompasses, without differentiation, both the notion of a trajectory when a movement is carried out in the absence of a road or physical track and the notion of a path as such. Similarly, in the remainder of the document, the term "change of direction" encompasses the notion of a deflection or modification of a trajectory and the notion of the selection of a path from among a plurality of possible paths downstream from the current path.

Finally, we will use the term "orientation instruction" to encompass the notion of an instruction that is aimed at modifying a current direction, as defined previously, that is, a selection of a downstream path, a deflection of a trajectory, possibly including a degree or, more generally, any supplementary information that is useful for the user in making a relevant recommended change of direction.

Among the many advantages provided by the invention, we can mention that:

- the indications provided by a navigation assistance system according to the invention are immediately intelligible for the recipient because they are visible at all times and particularly intuitive;
- the user of such a system benefits from precise and rich assistance without any negative experience inducing a loss of concentration or feeling invaded;
- the use of such a system maintains a very high degree of serenity and attention in the driver or hiker operating the system;
- according to the embodiment, a system according to the invention requires no structural modification of clothing or of vehicle elements, or even a support, in order to be utilized;
- a system according to the invention can be packaged in various ways, enabling adaption of configurations that are suitable for leisure, sports, or more generally envisaged travel;
- the preferred embodiment in the form of a pair of bracelets communicating with an intelligent mobile phone adapted by loading a suitable application ensures the provision of a highly economical, robust, playful, and high-performance device for the majority of people.

To this end, a visual and lateralized navigation assistance system is provided that supplies visual and lateral indications of orientation on the left and/or on the right side of a user's field of vision, comprising an electronic device and a first human-machine interface, wherein the electronic device and first human-machine interface cooperate via respective communication means, wherein the electronic device comprises a processing unit that is designed to produce an orientation instruction and generate and transmit an orientation instruction message that encodes the orientation instruction addressed to the first human machine interface, wherein the first human-machine interface comprises display means and a processing unit, the display means being controlled by the processing unit of the first human-machine interface in order to display a first light indication in response to the reception and decoding of the orientation instruction message.

In order to provide a lateralized visual aid and thus guide a user in a perfectly intuitive and non-invasive manner, the system comprises a second human-machine interface that cooperates with the electronic device and comprises display means and a processing unit, the display means being controlled by the processing unit of the second human-machine interface in order to display a second light indication in response to the reception and decoding of an orientation instruction message. In addition, the electronic device of such a system is designed to generate and trigger the transmission of an orientation instruction message to the first human-machine interface or the second human-machine interface, depending on the orientation of the change of direction with which the orientation instruction is concerned.

In order to maximize the effect attained by the technical solution and to facilitate consideration of the information by the user of the system, each of the first and second human-machine interfaces of such a system can comprise, or cooperate with, a main body that is designed to guide the respective emissions of the first and second light indications on the left and right of the field of vision of the user of the system, respectively.

In order to use such a system in multiple configurations, depending on the leisure activity or sport in question, for example, the main body can be designed to be adjusted to one of the limbs of the user of the system.

A packaging that is preferred but not limitative, the main body of each human-machine interface can consist of a bracelet that can be positioned on one of the user's wrists.

Independently of such packaging, in order to provide relevant light indications and to promote the lateralization of the perception of the indications by the user, the electronic device can generate and trigger the transmission of an orientation instruction message to the first human-machine interface if the change of direction with which the orientation instruction is concerned induces a directional orientation to the user's left. Conversely, the electronic device can generate and trigger the transmission of an orientation instruction message to the second human-machine interface if the change of orientation with which the orientation instruction is concerned induces a directional orientation to the user's right.

As an example of a preferred embodiment that enables the user of a system according to the invention to effortlessly interpret a guidance instruction and to anticipate a possible change of direction, the display means of the first and second human-machine interfaces can advantageously comprise first and second display spaces that are respectively controlled by the processing unit of the human-machine interface in question in order to display a lateralized light orientation signal and a time gauge reflecting the imminence of the change of direction indicated by the first display space. For this purpose, the orientation instruction message advantageously comprises a time-limit datum for the change of direction, the value of which defines the imminence of the change of direction.

In order to achieve an efficient, robust, and particularly economical solution, the first and second display spaces can each consist of two series of at least one light-emitting diode.

In order to round out the information supplied to the user and thus reduce the risk of uncertainty or misinterpretation, especially during a change of direction in the presence of numerous possible directions, the display means of the first and second human-machine interfaces can comprise a third display space, controlled by the processing unit of the human-machine interface in question, for displaying a figurative symbol from among a defined plurality of symbols. For this purpose, the orientation instruction message includes an additional field whose value designates the figurative symbol from among the defined plurality of symbols.

In order to ensure that an orientation instruction, although translated into a lateralized visual indication, is not disregarded by the user of an assistance system according to the invention, the first and second human-machine interfaces can comprise alerting means for reporting the imminence of a change of direction, with the alerting means emitting information of a nature that is different from light and being actuated by the processing unit of the human-machine interface having received the orientation instruction message when the imminence of a change of direction deduced from the message reaches a defined threshold.

In order to produce relevant and precise instructions in connection with the current terrestrial location of the user of a system according to the invention, the electronic device can comprise second communication means for collecting data from at least one remote satellite, the processing unit of the electronic device using the data to determine the terrestrial position of the electronic device.

According to one embodiment that minimizes the number of elements necessary for the implementation of the solution, the invention makes a provision that the electronic device and one of the two human-machine interfaces can constitute a single physical entity.

On the other hand, when the electronic device and the human-machine interfaces remain dissociated, the electronic device can be an intelligent mobile phone comprising a program memory that cooperates with the processing unit of the electronic device and records instructions from an application program, the execution or interpretation of which by the processing unit causes the implementation of a method for generating an orientation instruction message for one of the two human-machine interfaces.

Thus, according to a second object, the invention provides such a method for generating an orientation instruction message that is implemented by the processing unit of an electronic device of a visual and lateralized assistance system. Such a method comprises:
  a step for determining a guidance route;
  a step for determining the terrestrial position of the electronic device;
  a step for generating an orientation instruction; and
  a step for encoding the orientation instruction in the form of an orientation instruction message and transmitting the message to one of the two human-machine interfaces of the system, the message comprising an orientation datum whose value refers to a particular change of direction.

In order to ensure that only the appropriate human-machine interface from among the two is called upon at the time of a change of direction, the step for encoding the orientation instruction in the form of an orientation instruction message and sending the message consists in generating and transmitting the orientation instruction message to one of the two human-machine interfaces of the system depending on the orientation of the change of direction with which the orientation instruction is concerned.

In order to adapt an electronic device such that it operates within a visual and lateralized navigation assistance system according to the invention, a computer program product is also provided that comprises a plurality of program instructions which, when they are previously loaded into the program memory of an electronic device of such a system and then executed or interpreted by the processing unit of the electronic device, cause the implementation of a method for generating an orientation instruction message as discussed above.

BRIEF DESCRIPTION OF THE SEVERAL VIEWS OF THE DRAWINGS

Other features and advantages will become clearer on reading the description that follows and on examining the figures that accompany it, among which:

FIG. 1 describes an exemplary architecture of a navigation assistance system according to the invention comprising two human-machine interfaces that communicate with an intelligent mobile phone that has been adapted through implementation of a suitable application;

FIG. 4A shows a schematic view of an exemplary embodiment of means for displaying lateralized visual indications of a human-machine interface of a navigation assistance system according to the invention;

FIG. 4B describes several non-exhaustive examples of figurative information that is optionally displayed by a human-machine interface of a navigation assistance system according to the invention; and FIG. 5 shows a three-dimensional view of one of the two human-machine interfaces of a navigation assistance system according to the invention in the form of a communicating electronic bracelet.

DETAILED DESCRIPTION OF THE INVENTION

Figure 2:
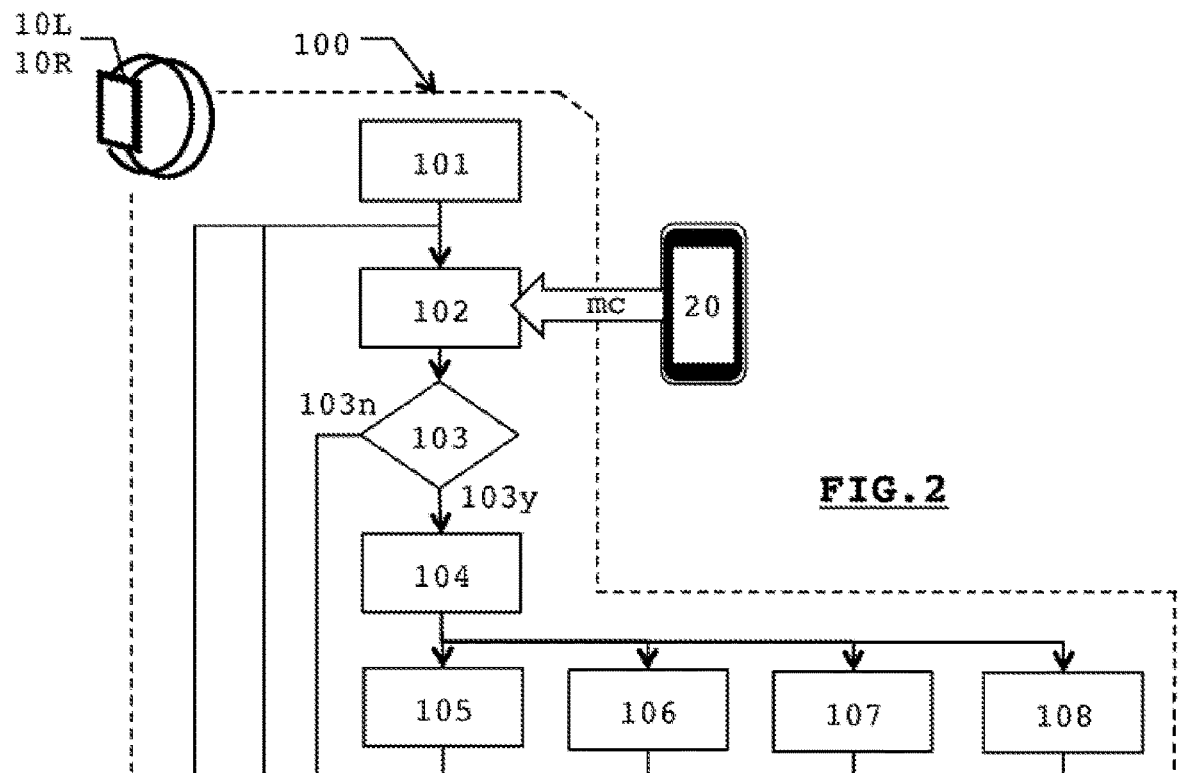
FIG. 2 describes a functional example of a method for outputting an orientation indication implemented by one of the human-machine interfaces of a navigation assistance system according to FIG. 1.

FIG. 1 shows a simplified architecture of a first embodiment of a visual and lateralized navigation assistance system according to the invention. Such a system comprises two human-machine interfaces 10L and 10R, for example in the form of two communicating electronic bracelets such as that described later in connection with FIG. 5. According to this first exemplary embodiment, the two human-machine interfaces 10L and 10R are similar in their architecture and operation. Also, for the sake of simplification, FIG. 1 only shows a detailed view of the means included in the human-machine interface 10L. This comprises a processing unit 11 in the form of one or more computers or microcontrollers cooperating by means of communication buses, symbolized by double arrows in FIG. 1, with a program memory 13 and a data memory 12. The memories 12 and 13 can merely constitute one and the same physical entity or be physically or logically dissociated. The program memory 13 is particularly intended to record instructions of a computer program product P10. The program instructions can be interpreted or executed by the processing unit 11 and cause the implementation of a method for outputting an orientation indication IL, IR or IC like the method 100 described later in connection with FIG. 2. The processing unit 11 also cooperates with first communication means 14, which are responsible for providing communication C1 with a remote electronic device 20, advantageously but not exclusively by wireless means. Such communication C1 can be implemented, for example, by utilizing a short-range wireless communication protocol such as Bluetooth, ZigBee, iBeacon, or any other equivalent protocol or technology. As an alternative, such communication C1 can be implemented in a wired manner by means of USB-type (Universal Serial Bus) communication, for example. In order to graphically output an orientation indication for a human user U, a human-machine interface 10L or 10R further comprises display means 15 in the form of one or more screens of sizes that are intentionally reduced to their simplest expressions. By way of non-limiting example, such display means 15 can consist of two or even three display spaces. The first display space 15-1 can consist of one or more light-emitting diodes or of a screen that is advantageously flexible in order to reduce the risk of breakage in the case of a fall, such as liquid crystals or any other equivalent. FIG. 4A, which will be described in greater detail later in conjunction with FIG. 2, describes an exemplary embodiment of such a first display space 15-1 in the form of a row of five light-emitting diodes. Such a diode is symbolized by a square with rounded edges. If the diode is off, the symbol is white. If the diode is on, the symbol is black. The main function of this first display space 15-1 is to supply a first IL-oriented lateralized light signal to the user U. Thus, if the user U is carrying or wearing the two human-machine interfaces 10L and 10R, respectively, on his two wrists—in the event that the human-machine interfaces 10L and 10R consist of two separate electronic bracelets as that described in FIG. 5, for example—the user U immediately and instinctively knows that he must move in a direction to his left when the first display space 15-1 of the interface 10L positioned on his left wrist delivers a light signal IL. Conversely, the user knows that he must move in a direction to his right when the first display space 15-1 of the human-machine interface 10R, which is positioned on his right wrist, delivers such a light signal IR. The light information IL or IR is instantly taken into account by the user by virtue of the fact that, if he is a touring cyclist, for example, he always has his forearms in his field of vision, since his hands are resting on his handlebars. The information supplied by the human-machine interfaces 10L and 10R is therefore present in the field of vision. Since the light signal IL or IR is lateralized (meaning that one of the two human-machine interfaces 10L and 10R is not outputting such a light signal at a given instant, apart from any signaling of a guidance incident), the user's brain U instantly assimilates such information in a completely intuitive manner without any mental effort. When the two human-machine interfaces 10L and 10R simultaneously deliver light information, we will see that this can mean a loss of roaming. Such conjoint light information, which can be described as "contradictory," will also be instantly taken into account by the user U, forcing him to make an inquiry.

A change of direction is information that the user U of the system must advantageously anticipate. A human-machine interface 10L or 10R according to the invention comprises a second display space 15-2 for this purpose. It can be similar in nature to the previous first display space 15-1, as described, FIG. 4A, as a non-limiting example. Such a second display space 15-2 can thus consist of a row of light-emitting diodes or a screen. However, its function is similar to a time gauge, in that it reflects the imminence of a change of direction that is being indicated by the first display space 15-1. Thus, the more the time gauge lights up—that is, the greater the number of its light emitting diodes that are lit—the more imminent the change of direction is. Accordingly, FIG. 4A shows a light information IL or IR at three distinct instants t1, t2, and t3. At time t1, the human-machine interface 10L or 10R in question is not delivering light information. Each of the two display spaces 15-1 and 15-2 consists of two rows of five light-emitting diodes that are off. At time t2, the first display space 15-1 is delivering straightforward light information (the five diodes constituting it are lit). The user then knows that a change of direction is near. The time gauge, two of whose five diodes are lit, indicates that the change should occur in n seconds, for example sixteen seconds. A third diode would be lit four seconds later, for example, and so on. When the change must be made (time t3 in FIG. 4), the five diodes of the time gauge are lit, thus alerting the user U that he must change direction to his left if it is the human-machine interface 10L positioned at the left of his field of vision that is delivering this light information IL or, vice versa, to his right if it is the human-machine interface 10R positioned at the right of the field of vision that is delivering the visual information IR. Any other method or technique could be alternatively implemented in order to instantiate and display such a time gauge. The same applies to the durations associated with the gauge. Indeed, if the traveler is walking, it will be possible to determine, i.e., parameterize, the time gradient of the gauge, for example by requesting an input means, such as a push button 18 or a microphone or any other equivalent means for transmitting parameters Pu to the processing unit 11. Such preferences Pu are recorded in the data memory 12. The user preferences Pu can also emanate from the electronic device 20 that is in communication with the two human-machine interfaces 10L and 10R, as will be described later.

Confidential tests have shown that it is possible to use the first display space 15-1 as an indicator of a degree of change of direction and thus inform a user U in the presence of a plurality of possible paths. In this case, like with the time gauge described in connection with the second display space 15-2, the invention makes a provision that the first space 15-1 can describe a directional gauge. The more the directional gauge is illuminated (that is, to name a non-limiting example, the greater the number of light-emitting diodes composing the first display space that are lit), the more the change of direction must be marked in relation to the current direction. Other tests have demonstrated a loss in intuitiveness and instinctive perception of such information IL or IR. A preferred embodiment of display means 15 can thus consist in providing a third optional display space 15-3, preferably in the form of a screen that is capable of displaying figurative symbols, such as the symbols S1 to S5 illustrated in FIG. 4B as non-limiting and non-exhaustive examples. In this case, the first display space 15-1 remains basic and Boolean, i.e., a simple and straightforward light signal (all the diodes are off in the absence of signaling or on to indicate a change of direction), and this information is rounded out by the optional display of a supplementary symbol by the third display space 15-3.

FIG. 4B thus presents some non-exhaustive examples of symbols, the displaying of which can be triggered by the processing unit 11 of a human-machine interface according to the invention, such as those described in connection with FIGS. 1 and 5 (10L and 10R).

A first example of a symbol, referenced S1 in FIG. 4B, gives the instruction to move slightly to the right in relation to the current trajectory. A second example S2 instructs the user U to simply turn right. The symbol S3 may indicate that the change of direction to the user's right must be clearly pronounced. Finally, a fourth example of a figurative symbol S4 may indicate to make somewhat of a U-turn to the right. In order to facilitate, if necessary, the instinctive understanding of the visual information produced, the invention makes a provision that the symbols can be displayed by the human-machine interface positioned in the left sector of the user's field of vision, presenting axial symmetry vertical to the examples described in connection with FIG. 4B, so that the indicated arrows are oriented to the left of the third display space 15-3 of the human-machine interface. Alternatively, the symbols can be identical. FIG. 4B also depicts a fifth example of a symbol S5 in the form of a number, in this case the number '2'. Such use of numbers instead of the figurative symbols S1 to S4, as described above, can constitute a clever manner of indicating the rank of an outlet from a roundabout, for example. Thus, the symbol S5 describing the digit '2' may give the instruction to take the second outlet.

In order to increase the lateralization of the visual information delivered to a user, the invention also makes a provision that the display means 15 of the first 10L and second 10R human-machine interfaces, which are intended to be respectively positioned at the left and at the right of the user's field of vision, also have axial symmetry. It is thus possible to make a provision that the third display space 15-3 is arranged to the left of the display means 15 of the human-machine interface 10L and to the right of those of the interface 10R. The same holds true for the virtual "filling" of the time gauges 15-2, or even of the directional gauges 15-1. Alternatively or in addition, any other ergonomic arrangement of the display means 15 with the aim of enhancing the intuitiveness of the lateralized visual information IL and IR perceived by the user could be considered.

Regardless of the arrangement that is adopted in order to instantiate the display means 15 of the two human-machine interfaces 10L and 10R, the invention makes it possible to deliver timely, complete, and relevant information to the user in order to guide him on his journey. Contrary to what is imposed by the previous solutions, the user perceives clear information IL, IR that is linked to a change of direction in his field of vision, i.e., without necessarily deviating from his current direction and thus without a loss of concentration, with the information being lateralized and hence taken directly and instinctively into account by the user and rounded out by a time gauge that indicates the imminence of the change of direction, or additional information in the case of multiple possible routes in order to prevent any navigation error.

Note that the information is elementary and reduced to its simplest expressions. In particular, when the display means 15 only has two display spaces 15-1 and 15-2, the display means 15 can consist of only two rows of a few light-emitting diodes, offering a particularly economical and robust solution.

Other confidential tests have shown, especially during long and/or difficult excursions, even if the display spaces 15-1, 15-2, or even 15-3 of the two interfaces 10L and 10R remain in the field of vision of a user of the navigation system, the user may be distracted and not perceive light information IL and/or IR that is delivered by one of the two human-machine interfaces 10L and 10R. The invention makes a provision that such human-machine interfaces 10L or 10R can further comprise means 16 for reporting the imminence of a change of direction in addition to the display means 15. The nature of such supplementary alerting means 16 is selected such that it delivers a signal IC of a nature different from light, such as a sound or preferably vibrational signal. Such means 16 can thus consist of a loudspeaker, a beeper (or buzzer), or a mobile flyweight in the manner of a vibrator for a mobile phone. The means 16 cooperates with and is electronically controlled by the processing unit 11. The alerting means 16 can be actuated by the processing unit 11, for example when the first display space 15-1 is actuated, and hence at the earliest when the time gauge 15-2 describes the instant at which the change of direction is to be performed, such as the time t3 described in connection with FIG. 4A.

Finally, the invention makes a provision that a human-machine interface 10L or 10R can comprise a source or reserve of electrical energy, such as one or more batteries, that is dimensioned so as to ensure the operation of the electronic components constituting the interface. Each human-machine interface 10L and 10R is thus autonomous and offers a decentralized functional architecture with great modularity, advantageously with a direct link to an electronic device 20, as described below, and is responsible for sending orientation instruction messages. Depending on the embodiment, each human-machine interface 10L or 10R can be linked to or completely independent of a second pair of human-machine interfaces. The failure of one can thus be of no consequence for the second. As we will see later, each human-machine interface 10L or 10R can cooperate with or be integrated into a support means 10S that is adapted to the situation, i.e., sport or leisure activity in question. Such a means 10S will be particularly designed to cooperate with or encase all or part of a limb of the human body, such as a wrist or, more generally, a distal portion of a limb. The arrangement of the support means 10S, which is advantageously separated from a housing as such (not shown in the figures) that would be responsible for accommodating and grouping the electronic elements of the human-machine interface 10L or 10R together, makes it possible to exploit the same human-machine interface in different configurations, i.e., worn in the manner of a watch as a bracelet, positioned on the top of a wrist, or inside or on the periphery thereof, or even on the top of a hand, so as not to impede the user in his gestures and maintain excellent lateralized vision during the user's movement.

In order to implement a method for outputting an orientation indication, such as the method 100 that we will describe in connection with FIG. 2, and thereby trigger the transmission of lateralized visual information accompanied by additional perceptible signals of optional alerts, it is necessary to produce orientation instructions from the current position on the surface of the Earth of the user of the system or of the vehicle he is driving and of a route chosen by the user or generated for the purpose of reaching a given destination.

Figure 3:
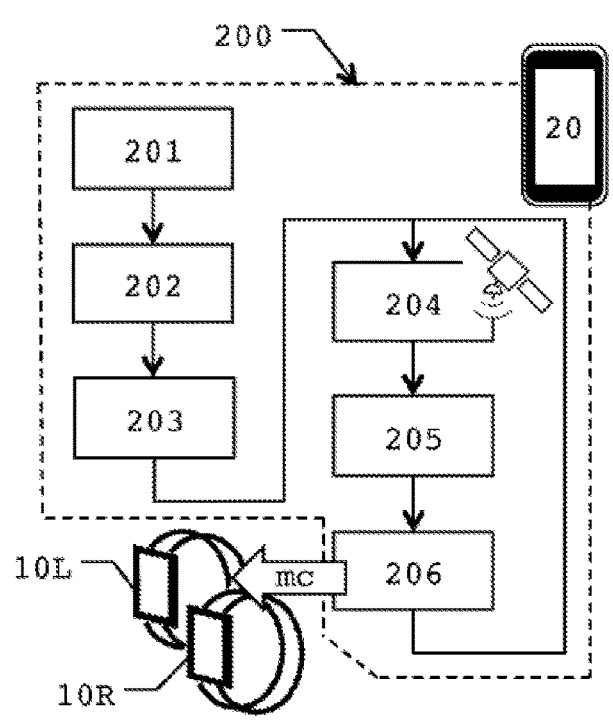
FIG. 3 describes an exemplary method for generating instruction messages implemented by an electronic device of a navigation assistance system according to the invention, with it being possible for the device to be the intelligent mobile phone described in connection with FIG. 1 or, alternatively, integrated with one of the human-machine interfaces also described in FIG. 1.

According to a first embodiment illustrated in FIG. 1, it is up to a processing unit 21 of an electronic device 20 that is distinct from the aforedescribed human-machine interfaces 10L and 10R to produce, according to a method of which one functional example is illustrated by FIG. 3, the orientation instructions, to encode them in the form of instruction messages mc, and to trigger the transmission thereof by first supplementary communication means 24 of the communication means 14 of the human-machine interfaces 10L or 10R. The joint operation of the means 14 and 24 makes it possible to establish the communication C1 between the electronic device 20 and the remote human-machine interfaces 10L and/or 10R, advantageously but not exclusively by wireless means. Such a communication C1 may constitute the terrain for a joint implementation by the electronic device 20 and the human-machine interfaces 10L and/or 10R of a recognition and/or pairing procedure so that the entities 20, 10L, 10R can exchange messages. Configuration or discovery messages, or even operating status messages, which are designated as mp in FIG. 1, can be exchanged according to conventional techniques of the art.

An electronic device 20 further comprises a program memory 23 and a data memory 22. The memories 22 and 23 can merely constitute one and the same physical entity or be physically or logically dissociated. Particularly in order to record instructions, the memory 23 is provided with a computer application program product PA. The program instructions can be interpreted or executed by the processing unit 21 and cause the implementation of a method for generating an orientation instruction message like the method 200 described later in connection with FIG. 3. The data memory 22, in turn, is designed to record user preferences, pre-established routes, etc. The data memories 22 and 12 also advantageously record identifiers specific to each element 20, 10L and 10R, or even secrets that are traditionally exploited in order to implement a secure and/or confidential communication C1 as mentioned above. All or only some of these identifiers and/or secrets stored in the data memories 22 and 12 can be exchanged by means of so-called configuration messages mp.

To determine its current position on the surface of the Earth, an electronic device 20 further comprises second communication means 25, generally known as GPS (Global Positioning System) receivers, in order to determine the location by triangulation using ms data transmitted by satellites. The means 25 thus make it possible to establish such remote communication C3 with a plurality of satellites such as those designated as ST1 and ST2 in FIG. 1. In general, it is necessary to cross the ms data transmitted by at least three separate satellites in order to accurately determine a terrestrial location. Alternatively or in addition, the communication means 25 can cooperate with other satellite systems, including but not limited to Galileo, GLONASS, or Beidou. The communication means 24 and 25 can constitute physically separate entities or also one and the same physical entity.

The invention also provides for alternative embodiments of the electronic device 20 and of the human-machine interfaces 10L and 10R. A first variant can consist in simplifying the structure of one of the two human-machine interfaces 10L or 10R. Instead of being similar and identical, as mentioned previously, one of the two human-machine interfaces can be the slave of the other. For example, as indicated in FIG. 1, the human-machine interface 10L can be responsible for receiving any message mc or mp emanating from the electronic device 20. When one of the messages transmitted to it is irrelevant—in this case, a message mc concerning an orientation instruction toward the right—the message mc is propagated, i.e., repeated, by the 10L human-machine interface to the sibling human-machine interface 10R via an advantageously wireless or wired communication C2. For this purpose, the human-machine interfaces 10L and 10R comprise second communication means 17 that cooperate with their respective processing units 11 to encode and/or decode secondary instruction messages mcs corresponding to propagated instruction messages. According to a second variant, the processing unit 11 of the slave human-machine interface can be simplified to nothing more than a signal controller that controls the supplementary display and/or alerting means 16. In this case, it is the processing unit 11 of the master human-machine interface—in the example shown in FIG. 1, the human-machine interface 10L—that produces the control signals of the display 15 and/or alerting means 16 of the slave human-machine interface 10R. The communication C2 as well as the second communication means 17 are then adapted and arranged accordingly. According to a third variant, the supplementary alerting means 16 may be present only on the master human-machine interface 10L. The same applies to any input means 18 that are also and exclusively present on the master human-machine interface 10L. The invention also provides a fourth variant, not described in FIG. 1, according to which the implementation of all or part of the processing performed by the electronic device 20 can be carried out by the processing unit 11 of one of the human-machine interfaces 10L or 10R. The invention even makes a provision that the electronic device 20 and one of the human-machine interfaces 10L or 10R can form one and the same physical entity. In this case, the communication C1 is reduced to its simplest expression. The processing units 11 and 21 can also be merged together, as can the data memories 12 and 22, or even the program memories 13 and 23 mentioned above. One of the electronic bracelets, such as that described in connection with FIG. 5, is thus responsible for determining its current terrestrial position and for producing orientation instructions.

Let us now study, in connection with FIG. 2, a non-limitative exemplary embodiment of a method 100 for representing an orientation indication implemented by a processing unit 11 of a human-machine interface according to the invention, such as the human-machine interfaces 10L and 10R described with reference to FIG. 1.

Such a method 100 comprises a first step 101 prior to any outputting of an orientation indication with the aim of configuring the operation of the human-machine interface 10L or 10R. Such a step consists in taking possible preferences Pu of the user U into consideration but also in participating in a discovery procedure between the human-machine interface implementing the method 100 and the electronic device 20, for example by means of one or more messages mp referenced in FIG. 1, or even with a slave human-machine interface. This step 101 makes it possible in particular to determine, and to write in data memory 13, information characterizing the fact that the human-machine interface 10L or 10R whose processing unit 11 is implementing the method 100 is to be positioned to the left or right in the field of vision of the user U. The method 100, which is described by FIG. 2, comprises a first step 102 of subsequent and iterative processing aimed at decoding an orientation instruction message mc received by the first communication means 14. Such a message mc advantageously comprises a plurality of informational fields, such as an identifier of the receiving human-machine interface to which the instruction message relates, an orientation datum whose predetermined value designates a particular change of direction among a pre-established set of possible changes, a time-limit datum for the change of direction, and even an additional and optional datum.

This iterative processing comprises a subsequent step 103 for verifying that the human-machine interface whose processing unit is implementing the method 100 is indeed the recipient of the orientation instruction message mc received. Such a check can consist in comparing the value of the identifier of the recipient contained in the message mc with that of the identifier specific to the human-machine interface that is implementing the method 100—recorded in the data memory 12, for example. Alternatively or in addition, it can consist of a filter for the orientation instruction message mc for retaining only those carrying an orientation instruction concerning a change of direction to the left or to the right, depending on the parameterization of the human-machine interface in the configuration step 101. When the human-machine interface implementing the method 100 is indeed the recipient of an orientation instruction message mc, a situation that is symbolized in FIG. 2 by the link designated as 103y, the method includes a step 104 for extracting and recognizing the characteristics of the change of direction and its imminence with respect to the values of the data read from the instruction message mc in relation to a table of possible changes of direction that is advantageously entered in the data memory 12. The iterative processing of the method 100 thus comprises a first step 105 for producing a control signal for the first display space 15-1 of the display means 15. Step 105 thus consists in controlling a display consisting of a plurality of light-emitting diodes so that the latter light up, or in triggering the display by a screen 15-1 of graphical content generated or read in the data memory 12. According to the example described with reference to FIG. 4A, the first display space 15-1 changes from a "diodes off" state at a time t1 prior to receiving the instruction message mc to a "diodes lit" state as described at time t2. Parallel to step 105, or previously or afterward, the method 100 comprises a step 106 for producing a control signal for the second display space 15-2 of the display means 15. Step 106 thus consists in controlling a display consisting of a plurality of light-emitting diodes so that all or some of the latter light up, or in triggering the display of graphical content generated or read in the data memory 12 by a screen constituting the display space 15-2. This step 106 consists in producing and triggering the display of the time gauge associated with the change of direction. According to the example described with reference to FIG. 4A, the second display space 15-2 changes from a "diodes off" state at a time t1 prior to receiving the orientation instruction message mc to a "diodes lit" state at time t2 and t3, depending on the earliness of the change of direction.

Steps 105 and 106 can also be implemented in parallel, before or after a step for controlling the alerting means 16 if the human-machine interface comprises one. Depending on the timing of the change of direction extracted from the instruction message mc, such a step 106 may consist in actuating the alerting means 16 for a predetermined duration (one second, for example) and at a likewise predetermined frequency. The invention makes a provision that such an alert is effective only at certain times relative to a change of direction. Thus, according to this timing, no control signal of the alerting means 16 can be produced while the first and second display spaces are actuated. For this, the invention provides one or more determined thresholds whose values can be stored in the data memory 12, for example following the implementation of the abovementioned configuration step 101. When the imminence of a change of direction deduced from an orientation instruction message mc reaches the value of one of the determined thresholds, step 106 is triggered. The same applies to an optional second step 108 for actuating the third display space, if it exists. This step aims to control the third display space 15-3 such that the latter displays graphical content generated or read in the data memory 12 by means of a screen. This step 108 consists in producing and triggering the displaying of one of the symbols described as non-limitative examples in FIG. 4B on the basis of the characteristics of the change of orientation extracted in step 104 from the instruction message mc.

The iterative processing constituted by steps 102 to 108 is then terminated. The lateralized graphical information IL or IR reproduced by the display means 15 for the user U is maintained until the next instruction message mc is received.

In the event that the processing unit 11 implementing such a method 100 is to control the second human-machine interface as a slave (a situation that is symbolized by the link designated as 109y in FIG. 2), the method 100 can comprise a step 110 for producing a secondary instruction message mcs, as discussed above, that is addressed to the slave human-machine interface. A configuration test designated as 109 in FIG. 2 is provided for this purpose. Steps 109 and 110 are implemented only if the test 103 has determined (a situation that is symbolized by the link 103n in FIG. 2) that the instruction message mc received in step 102 was not intended for the master human-machine interface. In the event that the processing unit 11 implementing the method 100 is not to manage instruction messages for a slave human-machine interface (a situation that is symbolized by the link 109n in FIG. 2), the iterative processing triggered at the end of step 102 is interrupted until the next instruction message mc is received.

In order to trigger the implementation of a method for outputting a visual orientation indication IL, IR, or even a vibrating orientation indication IC, by a processing unit 11 of a human-machine interface according to the invention, such as the human-machine interfaces 10L and 10R described in connection with FIG. 1 implementing a method 100 described in connection with FIG. 2, the invention provides an electronic device 20, for example in the form of a smart mobile phone, that is designed to generate orientation instruction messages mc addressed to the human-machine interfaces 10L and 10R. Such an adaptation consists, for example, in loading instructions of an application program PA, the execution or interpretation of which by the processing unit 21 of the electronic device 20 causes the implementation of an appropriate method whose main features are illustrated by the method 200 described with reference to FIG. 3 by way of non-limiting example.

Such a method 200 comprises a first step 201 for determining or selecting a route along which a user wishes to be guided. For this purpose, the processing unit 21 of the electronic device 20 triggers the displaying of one or more graphic or sound selection menus by display means, a loudspeaker, and/or input means (not shown in FIG. 1). These can consist of a touch screen, for example, or even a microphone. Such a method 200 can further comprise a step 202 for configuring the subsequent execution, by the processing unit 21, of the other steps of the method 200 on the basis of one or more preferences of the user U. Such preferences can be translated by the display and/or input means of the electronic device 20 into one or more operating parameters, the respective values of which can be advantageously stored in the data memory 22 of the electronic device 20. In this way, the user U of the electronic device 20 can inform the processing unit 21 as to its choices and preferences for selecting the shortest route with regard to a given destination, the route having the least difficulty, a frequency, and/or a time required, or even a given distance up to the crossing of a characteristic point on the route, in order to benefit from an orientation instruction, etc. In order to communicate and cooperate with the interfaces 10L and 10R (communication designated as C1 in FIG. 1), it is advantageous to implement a pairing or discovery protocol 203. Such a step is required particularly if the communication C1 established between the different entities is "wireless." Alternatively, such a step 203 could be optional if the communication C1 is wired. By way of non-limiting example, such a step 203 can consist in transmitting, by the communication means 24, a discovery request, for example via a Bluetooth short-range wireless communication protocol, and awaiting a response in the form of a message mp emanating from a human-machine interface 10L and/or 10R comprising the identifier of the human-machine interface or a secret or any other element that can characterize the interface. Such an exchange consists in the joint implementation of step 201 by the processing unit 21 of the electronic device 20 and by abovementioned step 101 of a method 100 by the processing unit 11 of a human-machine interface 10L or 10R.

Once steps 201, 202 and 203 have been carried out, a method for generating orientation instruction messages mc, such as the method 200 that is illustrated by way of non-limiting example in FIG. 3, now advantageously comprises iterative processing comprising a series of steps. The first step 204 consists in taking the terrestrial position of the electronic device 20 into consideration. To do this, step 204 commands the processing unit 21 to collect data transmitted by a plurality of satellites via the GPS receiver means 25 or any equivalent. Knowing the desired route as determined in step 202, the respective terrestrial coordinates of a plurality of characteristic crossing points of which are stored in the data memory 22, a step 205 consists in producing an orientation instruction that is intended to maintain the electronic device 20, and hence the user U thereof, on the desired route, or to return the user U to the latter. The implementation of such a step 205 can be triggered at the end of a time period of predetermined duration or when one of the above-mentioned characteristic crossing points is approaching. Step 205 thus determines whether the user needs to maintain or change his heading. In the latter case, an orientation instruction to turn toward the left, toward the right, or even to make a U-turn is generated. Such an instruction can be enriched, in the case of a fork or an intersection, by determining a degree of deviation from the required trajectory or tracking index (for example, choosing the $n^{th}$ outlet of a roundabout). When an orientation instruction aims to advise the user to turn to the left, a step 206 consists in encoding this orientation instruction generated in 205 in the form of an orientation instruction message mc addressed to the human-machine interface that is intended to be positioned at the left of the user's field of vision, in this case the interface 10L. If, on the other hand, the orientation instruction relates to a recommended change of direction to the user's right, step 206 consists in producing an orientation instruction message mc addressed to the human-machine interface positioned at the right of the user's field of vision, in this case the human-machine interface 10R according to FIG. 1. More generally, step 206 thus consists in triggering the transmission of an orientation instruction message mc addressed to a first human-machine interface or to a second human-machine interface, depending on the orientation of the change of direction invoked by the orientation instruction encoded by the message mc.

The invention makes a provision that it can also be determined in step 205 that it is preferable for the user U to turn back, because the user is tending to depart inexorably from the recommended route. In this case, step 206 may consist in generating and then issuing two messages mc addressed respectively to the two human-machine interfaces 10L and 10R and encoding the same orientation instruction, for example with the meaning "you should strongly skew your direction." As indicated by situation t3 in FIG. 4A, the simultaneous consideration of such information by the two human-machine interfaces 10L and 10R results in the spontaneous alerting of the user U. Faced with concomitant visual indications IL and IR that would induce contradictory and simultaneous instructions for or actions by the user—for example, "turn to the left" and "turn to the right"—the user actually understands instantly that he is going astray or facing a guiding limit. He can then proceed to make a U-turn or at least inquire about his current path. When the display means 15 of one or both of the two human-machine interfaces comprises a third display space 15-3, the latter can display the symbol S4, which is described by way of example by FIG. 4B. In this case, the message mc produced in step 206 can comprise meta-information designating the symbol or predetermined characteristic information that informs each human-machine interface of the need for a U-turn.

Such a step 206 thus advantageously consists in producing a message mc encoding a plurality of informational fields, such as an identifier of the receiving human-machine interface, an orientation datum whose predetermined value designates one change of direction among a pre-established set of possible changes, a time-limit datum for the change of orientation, and even an additional and optional datum, hereinafter called meta-information.

Steps 204, 205 and 206 are thus iterated until the user U reaches his destination.

The invention has been described in a preferred manner in connection with the exemplary configuration of a system according to the invention as presented in FIG. 1 that comprises two human-machine interfaces 10L and 10R in the form of a bracelet or a watch. FIG. 5 shows a highly simplified, schematic illustration of an exemplary embodiment of a human-machine interface 10L or 10R that is being worn in the advantageous form of a bracelet, whose main body 10S constitutes a support for the previously described elements 11 to 19 and of which only the display means 15 comprising three display spaces 15-1, 15-2 and 15-3, as described by way of example in FIGS. 4A and 4B, has been omitted for the sake of simplification. The support 10S can be arranged so as to encapsulate the electronic members or elements, with it also being possible for the latter to be further united in a housing that does not obscure the display means 15 in order to provide them with excellent protection against shocks and bad weather, with the exception of all or part of the "active face" of the display means 15, that is, any visible portion of a screen or light-emitting diodes, in order to enable the visual transmission of graphical indications delivered by the display means 15. The body 10S can advantageously have a projection, not shown in FIG. 5, for orienting the display means further toward the user's field of vision. The body 10S can further comprise any locking means, not shown in FIG. 5, and be designed to adjust the strap 10L or 10R to the user's morphology, for example, as well as optionally a terminal block to enable the connection of a cable necessary for charging the battery or batteries 19 required for the operation of the human-machine interface. Such recharging can also be provided through induction.

The invention cannot be limited to this single manner of packaging a human-machine interface. For instance, the main body or support 10S of such a human-machine interface can constitute all or part of a glove into which the user can slide a hand or, more generally, a garment that is suitable for carrying one or two human-machine interfaces 10L, 10R. Alternatively, the body 10S of such a human-machine interface can be designed to cooperate with the handlebars of a two-wheeled vehicle or any equivalent, such as a bicycle, a motorcycle, a motorized watercraft, etc., and be advantageously fixed near one of the distal portions of the handlebar, i.e., near one of the grips of the handlebar. The lateralization of the visual information IL and IR that is jointly delivered by such mutually spaced-apart human-machine interfaces 10L and 10R, which are respectively positioned at the left and at the right of the field of vision of the user of the two-wheelers, is thus enhanced. Finally, the body 10S can also cooperate with or comprise fastening elements on a dashboard of a vehicle having a passenger compartment, such as a car, truck, boat, etc. This makes it possible to respectively arrange two human-machine interfaces 10L and 10R to the left and right within the driver's field of vision. The invention also provides for the arrangement of the body or support 10S of such a human-machine interface so as to satisfy the constraints imposed by other leisure or sports activities. For instance, such a human-machine interface can be arranged so as to be positioned on an accessory that is visually accessible in the user's field of vision, such as a ski board near the tip or even the upper portion of a ski pole or hiking stick.

The invention claimed is:

1. A visual and lateralized navigation assistance system that supplies visual and lateral indications of orientation on the left and/or on the right side of the field of vision of a user, comprising an electronic device, a first human-machine interface and a second human-machine interface, wherein the electronic device and first and second human-machine interfaces cooperate via wireless communication, wherein the electronic device comprises a processing unit that is configured to produce an orientation instruction and generate and transmit an encoded orientation instruction message that includes the orientation instruction addressed to the first and/or second human machine interfaces, wherein each of the first and second human-machine interfaces comprises a wireless communication interface, a display and a processing unit, the display being controlled by the processing unit of each of the first and second human-machine interfaces in order to display a light indication in response to a reception and decoding of the encoded orientation instruction message,
wherein the first human-machine interface is configured to be placed on the right side of the field of vision and the second human-machine interface is configured to be placed on the left side of the field of vision, and
wherein the electronic device is configured to generate and trigger the transmission of an encoded orientation instruction message to the first human-machine interface or the second human-machine interface, depending on the orientation of the change of direction with which the orientation instruction is concerned.

2. The system according to claim 1, wherein each of the first and second human-machine interfaces comprises, or cooperates with, a main body that is designed to guide the respective emissions of the first and second light indications on the left and right of the field of vision of the user of the system, respectively.

3. The system according to claim 2, wherein the main body is configured to be adjusted to one of the limbs of the user of the system.

4. The system according to claim 3, wherein the main body of each human-machine interface comprises a bracelet that can be positioned on one of the wrists of the user.

5. The system according to claim 2, wherein the electronic device generates and triggers the transmission of an encoded orientation instruction message to the first human-machine interface if the change of direction with which the orientation instruction is concerned induces a directional orientation to the left of the user.

6. The system according to claim 2, wherein the electronic device generates and triggers the transmission of an encoded orientation instruction message to the second human-machine interface if the change of orientation with which the orientation instruction is concerned induces a directional orientation to the right of the user.

7. The system according to claim 1, wherein:
the displays of the first and second human-machine interfaces comprise first and second display spaces that are respectively controlled by the processing unit of the corresponding human-machine interface for the purpose of displaying a lateralized light orientation signal and a time gauge indicating the imminence of a change of direction indicated by the first display space; and
the encoded orientation instruction message comprises a time-limit datum for the change, the value of which defines the imminence of the change of direction.

8. The system according to claim 7, wherein the first and second display spaces respectively comprise two series of at least one light-emitting diode.

9. The system according to claim 7, wherein:
the displays of the first and second human-machine interfaces comprise a third display space that is controlled by the processing unit of the corresponding human-machine interface for the purpose of displaying a figurative symbol from among a defined plurality of symbols; and
the encoded orientation instruction message includes an additional field whose value designates the figurative symbol from among the defined plurality of symbols.

10. The system according to claim 7, wherein the first and second human-machine interfaces comprise alert indicators for reporting the imminence of a change of direction, with the alert indicators emitting information of a nature that is different from light and being actuated by the processing unit of the human-machine interface having received the encoded orientation instruction message when the imminence of a change of direction deduced from the encoded orientation instruction message reaches a defined threshold.

11. The system according to claim 1, wherein the electronic device comprises a second communication interface for collecting data from at least one remote satellite and wherein the processing unit of the electronic device uses the data to determine a terrestrial position of the electronic device.

12. The system according to claim 1, wherein the electronic device and one of the two human-machine interfaces are embodied in a common physical entity.

13. The system according to claim 1, wherein the electronic device is an intelligent mobile phone comprising a program memory that cooperates with the processing unit of the electronic device and records instructions from an application program, the execution or interpretation of which by the processing unit causes the implementation of a method for generating an encoded orientation instruction message for one of the two human-machine interfaces.

14. A method for generating an encoded orientation instruction message implemented by the processing unit of the electronic device of a visual and lateralized navigation assistance system according to claim 11, comprising:
a step for determining a guidance route;
a step for determining the terrestrial position of the electronic device;
a step for generating an orientation instruction;
a step for encoding the orientation instruction in the form of an encoded orientation instruction message and transmitting the encoded orientation instruction message to one of the two human-machine interfaces of the system, the encoded orientation instruction message comprising an orientation datum whose value refers to a particular change of direction;
wherein the step for encoding the orientation instruction in the form of an encoded orientation instruction message and sending the encoded orientation instruction message comprises generating and transmitting the encoded orientation instruction message to one of the two human-machine interfaces of the system depending on the orientation of the change of direction with which the orientation instruction is concerned.

15. A non-transitory computer-readable medium encoded with a program comprising a plurality of program instructions which, when loaded into program memory of an electronic device of a visual and lateralized navigation assistance system and then executed or interpreted by a processing unit of the electronic device, cause the implementation of a method for generating an encoded orientation instruction message according to claim 14.

16. A pair of human-machine interfaces, wherein each of the pair of human-machine interfaces has a main body which comprises:
- a wireless communication interface configured to communicate through a wireless channel for receiving an encoded orientation instruction message from an electronic device,
- a processing unit configured to decode the encoded orientation instruction message,
- a display controlled by the processing unit in order to display a light indication in response to the reception and decoding of the encoded orientation instruction message, wherein one human-machine interface of the pair is configured to be placed on a right side of a field of vision of a user and the other human-machine interface of the pair is intended to be placed on a left side of the field of vision of the user.

\* \* \* \* \*